Dec. 1, 1964 A. STEWART 3,159,363
PITCH AND ROLL ATTITUDE CONTROL SYSTEM FOR
AIRCRAFT HAVING VERTICAL LIFT JET ENGINES
Filed Sept. 3, 1963
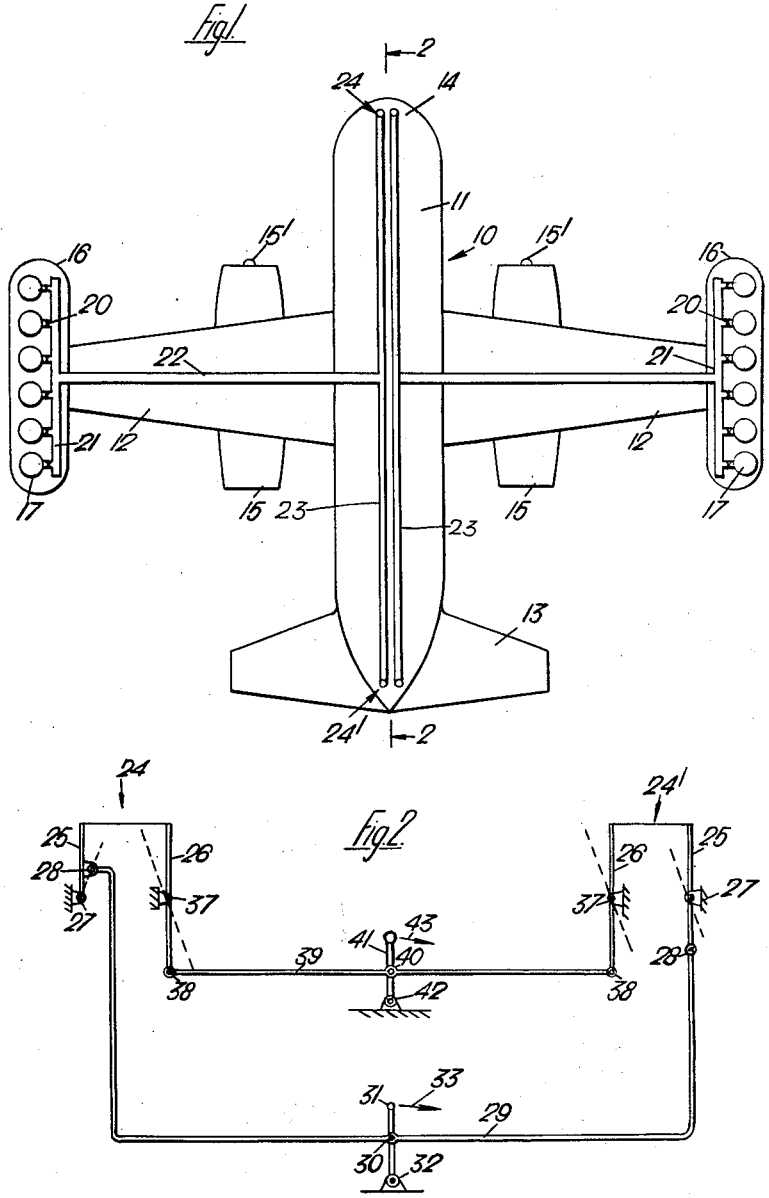
Inventor
Alexander Stewart
By
Cushman, Darby & Cushman
Attorneys 3,159,363
PITCH AND ROLL ATTITUDE CONTROL SYSTEM FOR AIRCRAFT HAVING VERTICAL LIFT JET ENGINES
Alexander Stewart, Spondon, Derby, England, assignor to Rolls-Royce Limited, Derby, England, a company of Great Britain
Filed Sept. 3, 1963, Ser. No. 306,016
Claims priority, application Great Britain, Sept. 5, 1962, 34,107/62
4 Claims. (Cl. 244—52)

This invention concerns aircraft.

According to the present invention, an aircraft is provided with two vertical lift jet engines, or banks of engines, which are disposed on opposite sides of either the longitudinal or transverse axis of the aircraft, a bleed duct for each engine or bank of engines, each bleed duct being adapted for the flow therethrough of a portion only of the gases passing through the engine or bank of engines and each bleed duct having at least one outlet nozzle which is disposed adjacent to said axis, and flight attitude control means which are adapted to vary the relative flows through the two or more outlet nozzles, whereby to control the flight attitude of the aircraft.

The term "vertical lift" engine as used in this specification is to be understood to mean an engine which is adapted and arranged to produce vertical lift forces on the aircraft other than those produced aerodynamically by forward flight thereof.

Preferably each of the outlet nozzles is a variable area nozzle, the flight attitude control means comprising means for varying the effective area of each outlet nozzle.

Each bleed duct is preferably provided with two outlet nozzles which are disposed on opposite sides of, and are spaced from, the other axis of the aircraft.

The flow through each of the said two outlet nozzles is preferably independently controlled by two flap members each of which is connected to a respective flap member of the other outlet nozzle, one pair of flap members being connected together so that the two flap members may be simultaneously moved to reduce or increase the areas of the outlet nozzles, and the other pair of flap members being connected together so that when a selected one of them is moved to increase the area of its outlet nozzle the other is simultaneously moved to reduce the area of its outlet nozzle.

Each engine preferably communicates with its bleed duct by way of a variable area non-return valve.

Preferably there are two banks of engines which are symmetrically disposed on opposite sides of the longitudinal axis of the aircraft, each bank of engines having a bleed duct which is provided with two variable area outlet nozzles which are symmetrically disposed on opposite sides of the transverse axis of the aircraft, each outlet nozzle also being disposed adjacent the longitudinal axis of the aircraft.

The invention is illustrated, merely by way of example, in the accompanying drawings, in which:

FIGURE 1 is a diagrammatic plan view of an aircraft according to the present invention, and FIGURE 2 is a diagrammatic section, taken on the line 2—2 of FIGURE 1.

The terms "left-hand" and "right-hand," "clockwise" and "anticlockwise," as used in the description below are to be understood to refer to directions as seen in the drawings.

Referring to the drawings, an aircraft 10, which is adapted for vertical take-off and landing, has a fuselage 11, wings 12, tail plane 13, and nose 14.

Each of the wings 12 carries a pod 15 within which is mounted a forward propulsion gas turbine engine 15'.

At the tip of each of the wings 12 is mounted a pod 16, a bank of vertical lift gas turbine engines 17 being vertically mounted in each pod 16.

A portion of the air compressed in the compressor (not shown) of each of the vertical lift engines 17, may be bled therefrom, the said compressors of each bank of vertical lift engines 17 being connected, by way of variable area non-return valves 20, to a manifold 21.

Each manifold 21 communicates with a bleed duct 22 which extends along the transverse axis of the aircraft. Each bleed duct 22 has two branches 23 each of which is disposed closely adjacent to the longitudinal axis of the aircraft.

The branches 23 are provided at their outer ends with outlet nozzles 24, 24' which are respectively disposed adjacent the nose 14 and tail plane 13.

The effective area of each outlet nozzle 24, 24' is, as shown in FIG. 2, adjustable by movement of two flap members 25, 26. Each of the two flap members 25 is pivoted at 27 to the aircraft structure, and is pivoted at 28 to a link 29. The link 29 is pivotally connected at 30 to a lever 31 which is pivoted at 32 to the aircraft structure. When the lever 31 is moved in the direction of arrow 33, both the flap members 25 will be simultaneously moved towards the dotted line position in which the areas of both the outlet nozzles 24, 24' are reduced, while when the lever 31 is moved in the opposite direction both the flap members 25 will be simultaneously moved towards the full line position thereof, whereby to increase the areas of both the outlet nozzles 24, 24'.

Thus when one of the two levers 31 on the aircraft is moved while the other is not, variation will be effected in the relative flows through the left-hand and right-hand outlet nozzles 24, 24'.

Each of the flap members 26 is pivoted at 37 to the aircraft structure and is pivoted at 38 to a link 39. The link 39 is pivotally connected at 40 to a lever 41 which is pivoted at 42 to the aircraft structure.

When the lever 41 is moved in the direction of arrow 43, the left-hand and right-hand flap members 26 will be respectively moved simultaneously so as to reduce and increase the areas of the outlet nozzles 24, 24', while movement of the lever 41 in the opposite direction will cause the said flap members to be respectively moved simultaneously so as to increase and reduce the areas of the outlet nozzles 24, 24'.

Thus movement of either of the two levers 41 will vary the relative flow through the outlet nozzle 24 with respect to the flow through the outlet nozzle 24'.

In operation, if the aircraft develops a roll in an anti-clockwise direction about its longitudinal axis, this may be corrected by moving the lever 31 of the left-hand bank of vertical lift engines 17 in the direction of the arrow 33.

This will cause both flap members 25 to reduce the areas of their outlet nozzles 24, 24', whereby to reduce the air bled from, and therefore to increase the thrust of, the vertical lift engines 17 of the said left-hand bank of engines. The air bled from the said vertical lift engines 17 will pass out through the two left hand outlet nozzles 24, 24' and since these are disposed substantially on the longitudinal axis of the aircraft, the thrust produced by this bled air will not produce any rolling. Moreover, although some thrust will be lost by the vertical lift engines 17 by reason of the bleeding of air therefrom, a substantial proportion (e.g. nearly half) of this thrust will, in effect, be recovered by the thrust developed at the outlet nozzles 24, 24'.

Similarly, of course, if the aircraft develops a roll in a clockwise direction about its longitudinal axis, this may be corected by moving the lever 31 of the right-hand bank of vertical lift engines 17 in the direction of the arrow 33.

If the aircraft pitches about its transverse axis, this may be corrected by appropriate movement of the two levers 41. Thus if the tail plane 13 of the aircraft descends relatively to its nose 14, this may be corrected by moving the two levers 41 in the direction of the arrow 43. This will cause the left and right hand flap members 26 to reduce and increase respectively, the areas of the outlet nozzles 24, 24', whereby the thrust from the outlet nozzles 24' will exceed that from the outlet nozzles 24.

Similarly, if the nose 14 descends relatively to the tail plane 13, this may be corrected by moving the two levers 41 in the direction opposite to that of the arrow 43.

It will be appreciated that the construction shown in the drawings permits the flight attitude of the aircraft 10 to be controlled by means of air bled from the engines 17 and also permits this to be done with very little loss of thrust. It will also be appreciated that the loss of thrust will, in the construction shown in the drawings be very much less than would be experienced if one of the banks of vertical lift engines 17 were merely throttled so as to correct rolling.

I claim:

1. An aircraft provided with at least two vertical lift jet engines disposed on opposite sides of an axis of the aircraft, a bleed duct for each engine, each bleed duct being adapted for the flow therethrough of a portion only of the gases passing through the engine and each bleed duct having a pair of variable area outlet nozzles disposed adjacent to said axis, the outlet nozzles of each bleed duct being disposed on opposite sides of and spaced from another axis of the aircraft, and flight attitude control means arranged to independently vary simultaneously the effective areas of the pair of outlet nozzles in each bleed duct to thereby control the flight attitude of the aircraft.

2. An aircraft provided with at least two vertical lift jet engines disposed on opposite sides of an axis of the aircraft, a bleed duct for each engine, each bleed duct being adapted for the flow therethrough of a portion only of the gases passing through the engine and each bleed duct having two variable area outlet nozzles disposed adjacent to said axis, two flap members independently controlling the flow through each of the said two outlet nozzles of each duct, and means connecting each flap member to a respective flap member of the other outlet nozzle of the same duct, one pair of flap members of the same duct being connected together so that the two flap members may be simultaneously moved selectively to reduce or increase the areas of the outlet nozzles, and the other pair of flap members of the same duct being connected together so that when a selected one of them is moved to increase the area of its outlet nozzle the other is simultaneously moved to reduce the area of its outlet nozzle.

3. An aircraft as claimed in claim 2 in which each engine communicates with its bleed duct by way of a variable area non-return valve.

4. An aircraft as claimed in claim 2 in which there are two banks of engines which are symmetrically disposed on opposite sides of the longitudinal axis of the aircraft, each bank of engines having a bleed duct provided with two variable area outlet nozzles which are symmetrically disposed on opposite sides of the transverse axis of the aircraft, each outlet nozzle also being disposed adjacent the longitudinal axis of the aircraft.

References Cited by the Examiner
UNITED STATES PATENTS 3,111,289  11/63  Murphy _____ 244—52

FOREIGN PATENTS 806,030  12/58  Great Britain.

OTHER REFERENCES

German Printed application 1,080,860, Apr. 28, 1960.

FERGUS S. MIDDLETON, *Primary Examiner.*